(12) United States Patent
Hursey et al.

(10) Patent No.: US 7,673,342 B2
(45) Date of Patent: Mar. 2, 2010

(54) DETECTING E-MAIL PROPAGATED MALWARE

(75) Inventors: Neil John Hursey, Hertford Heath (GB); William Alexander McEwan, Newton Blossomville (GB)

(73) Assignee: McAfee, Inc., Santa Clara, CA (US)

( * ) Notice: Subject to any disclaimer, the term of this patent is extended or adjusted under 35 U.S.C. 154(b) by 1180 days.

(21) Appl. No.: 09/912,391

(22) Filed: Jul. 26, 2001

(65) Prior Publication Data

US 2003/0023875 A1    Jan. 30, 2003

(51) Int. Cl.
  G06F 11/00    (2006.01)
  G06F 12/14    (2006.01)
  G06F 15/16    (2006.01)
  G08B 23/00    (2006.01)
  G06F 11/30    (2006.01)

(52) U.S. Cl. .............. 726/24; 726/22; 726/23; 713/188; 709/206

(58) Field of Classification Search ........ 713/188, 713/201; 709/206; 726/24, 22, 23
See application file for complete search history.

(56) References Cited

U.S. PATENT DOCUMENTS

| | | | |
|---|---|---|---|
| 6,725,377 B1 * | 4/2004 | Kouznetsov | 713/201 |
| 6,732,149 B1 * | 5/2004 | Kephart | 709/206 |
| 6,763,462 B1 * | 7/2004 | Marsh | 713/188 |
| 6,763,467 B1 * | 7/2004 | Radatti et al. | 726/24 |
| 6,779,021 B1 * | 8/2004 | Bates et al. | 709/206 |
| 6,785,732 B1 * | 8/2004 | Bates et al. | 709/232 |
| 6,802,012 B1 * | 10/2004 | Smithson et al. | 726/24 |
| 6,842,773 B1 * | 1/2005 | Ralston et al. | 709/206 |
| 6,851,058 B1 * | 2/2005 | Gartside | 713/200 |
| 6,886,099 B1 * | 4/2005 | Smithson et al. | 726/24 |
| 6,901,519 B1 * | 5/2005 | Stewart et al. | 726/24 |
| 6,922,781 B1 * | 7/2005 | Shuster | 713/188 |
| 6,973,577 B1 * | 12/2005 | Kouznetsov | 707/9 |
| 2002/0004908 A1 * | 1/2002 | Galea | 713/200 |
| 2002/0194489 A1 * | 12/2002 | Almogy et al. | 713/200 |
| 2004/0054498 A1 * | 3/2004 | Shipp | 702/182 |
| 2004/0064515 A1 * | 4/2004 | Hockey | 709/206 |
| 2004/0073617 A1 * | 4/2004 | Milliken et al. | 709/206 |

\* cited by examiner

*Primary Examiner*—Matthew T Henning
(74) *Attorney, Agent, or Firm*—Zilka-Kotab, PC

(57) ABSTRACT

An e-mail client serves to detect mass mailing malware by detecting if over a threshold number of addressees from within the address book of that e-mail client are being sent an e-mail or over a predetermined number of substantially identical e-mails are being sent by that e-mail client. A quarantine queue may be provided in which e-mail messages are held for a predetermined period prior to being sent out in order that separate e-mail messages being sent to a large proportion of the address book addressees may be identified and linked together.

25 Claims, 4 Drawing Sheets

DETECTING E-MAIL PROPAGATED MALWARE

BACKGROUND OF THE INVENTION

1. Field of the Invention

This invention relates to data processing systems. More particularly, this invention relates to the detection of e-mail propagated malware.

2. Description of the Prior Art

Some of the most prolific and damaging computer viruses in recent times have replicated and distributed themselves by use of the victim's e-mail service. The virus is received in an e-mail and when activated serves to replicate and send itself to most, if not all, of the e-mail addresses listed in the victim's e-mail address book. The infected e-mail is then received by another unsuspecting user who again causes it to replicate it propagate.

Network Associates, Inc. provide a server based computer program called Outbreak Manager that operates upon an e-mail server to detect patterns of mail traffic behaviour indicative of such a virus outbreak and progressively to apply counter-measures against that outbreak. This activity necessarily places a data processing load upon the e-mail server and tends to detect a virus outbreak only when this has escalated to at least some extent of mass behaviour.

A further mechanism for suppressing mass mail viruses is described in commonly assigned co-pending Application No.: U.S. Ser. No. 09/678,688, the disclosure of which is incorporated herein by reference.

SUMMARY OF THE INVENTION

Viewed from one aspect the present invention provides a computer program product operable to control an e-mail client computer to detect e-mail propagated malware, said computer program product comprising:
  e-mail generating logic operable to generate an e-mail message;
  comparison logic operable to compare said e-mail message with at least one of an address book of a sender of said e-mail message and one or more previously generated e-mail messages from said client computer; and
  identifying logic operable to identify said e-mail message as potentially containing malware if at least one of:
    (i) said e-mail message is being sent to more than a threshold number of addressees specified within said address book;
    (ii) said e-mail message contains message content having at least a threshold level of similarity to message content of said previously generated e-mail messages being sent to more than a threshold number of addressees specified within said address book; and
    (iii) said e-mail message contains message content having at least a threshold level of similarity to message content of more than a threshold number of said previously generated e-mail messages.

The invention recognises that an e-mail client computer can act to detect many mass mailing malware problems since this type of malware will often produce characteristic and abnormal behaviour on the e-mail client computer itself which behaviour may be detected and used to trigger action to stop the outbreak at an early stage. Furthermore, placing a processing load upon the client computers rather than the e-mail server distributes the processing load more widely in an advantageous fashion. The characteristic behaviour on the e-mail client computer itself can take a variety of forms, but is at least one of generating an e-mail message sent to greater than a given number of addressees within the address book associated with that client computer (either as a single e-mail or as a series of e-mails sharing substantially the same message content) or as a series of e-mail messages containing substantially the same message content exceeding a predetermined threshold number.

It will be appreciated that the threshold number of addressees within the address book could be defined in a variety of different ways. As an example, it could be defined as an absolute number, but in preferred embodiments is defined as a predetermined (user specified) proportion of the total number of addressees within the address book.

The message content of e-mail messages could be compared in a variety of different ways. E-mail messages could be identified as similar only when they were identical. However, in order to provide protection against malware which seeks to disguise itself, preferred embodiments of the invention identify message content as the same when a predetermined level of similarity is detected, such as for example by using known algorithms like those found within the WinDiff program.

In order to help resist mass mailed malware which propagates itself as a sequence of separate e-mail messages directed to individual addressees (or a relatively small number of addressees), preferred embodiments of the invention utilise a quarantine queue from which outbound messages are held for a predetermined period before being sent on. This allows messages to be compared with one another to identify those having above a predetermined level of similarity in order that they may be identified as potentially carrying malware and appropriate counter-measures triggered.

The non-realtime nature of e-mail delivery and the relatively high processing speeds of e-mail systems are such that the quarantine period may be kept relatively low, say several seconds, without producing a noticeable impact on the system performance for a user and yet sufficient time for a sequence of related e-mails to be generated by a malware program and accordingly detected before the first of those e-mails is sent from the client computer out to the addressee.

It will be appreciated that the characteristics of mass mailed malware discussed above are not necessarily definitive as there may be good reasons why a genuine e-mail message, or sequence of e-mail messages, may be generated by a user and yet have these properties. Accordingly, preferred embodiments of the invention act to trigger user confirmation of the nature of an e-mail message identified as potentially containing malware before it is issued.

Patterns of behaviour within an administered group of computers or patterns of behaviour of an individual user may be more readily recognised in preferred embodiments in which when an item of potential malware is identified a message is sent to an administrator of the system.

Preferred embodiments of the invention may speed processing by seeking to identify potential malware only within e-mail messages that have an executable element (e.g. an executable attachment or HTML body) as an executable payload is required by a virus propagating e-mail.

Further aspects of the invention provide a method for detecting malware within a client computer and an apparatus for detecting malware within a client computer.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
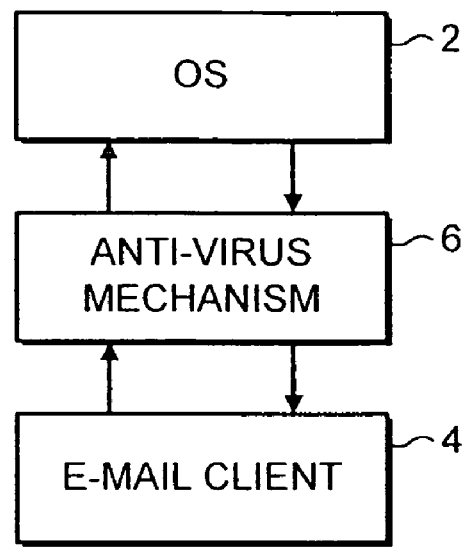
FIGS. 1 and 2 illustrate two examples of how an anti-virus mechanism may be combined with an e-mail client and an operating system within a client computer.

FIG. 1 schematically illustrates software elements within a client computer. An operating system 2 is provided for controlling interaction of the computer hardware with higher level computer software. In the case of the Windows operating system produced by Microsoft Corporation, the operating system 2 provides a Messaging Application Programming Interface that is used by application programs wishing to use messaging functionality, such as e-mails, in order to interact with the underlying messaging systems. An e-mail client computer program 4 is used by a user to generate and receive e-mail messages. An example of such an e-mail client computer program would be Microsoft Outlook produced by Microsoft Corporation.

Disposed between the e-mail client computer program 4 and the operating system 2 is the anti-virus mechanism 6. In FIG. 1 example this anti-virus mechanism 6 serves to receive all MAPI requests from the e-mail client computer program 4 and generate any MAPI responses to the e-mail client computer program 4. The anti-virus mechanism 6 has a further interface with the operating system 2 to which the intercepted messages are sent or from which intercepted messages are received. Having intercepted this traffic, the anti-virus mechanism 6 can apply the techniques described hereinafter to resist mass mailing malware.

Figure 2:
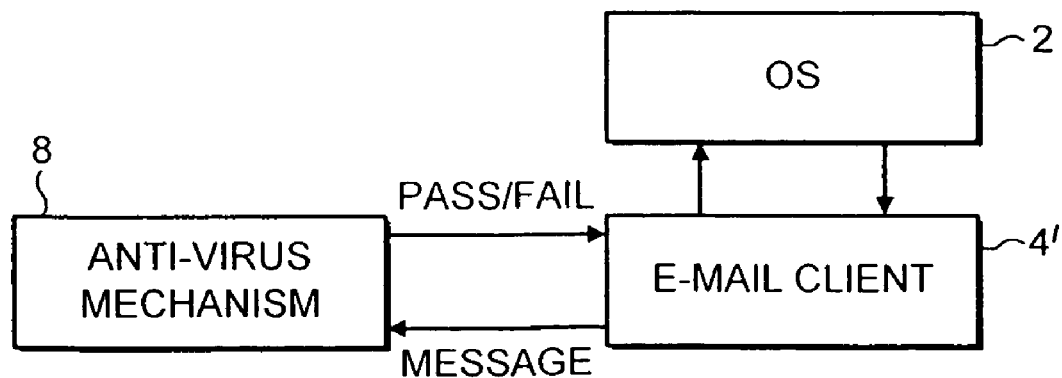

FIG. 2 illustrates an alternative arrangement in which the e-mail client computer program 4' is modified to send all its outbound messages to an anti-virus mechanism 8 for checking for mass mailing malware behaviour prior to a pass/fail result being returned from the anti-virus mechanism 8 indicating that the e-mail client 4' can issue the e-mail message and to the operating system 2.

Both the arrangement of FIG. 1 and FIG. 2 will be familiar to programmers in the application program field as ways of adding new functionality in combination with existing programs and mechanisms by redirecting and intercepting messages passed between those programs and mechanisms.

Figure 3:
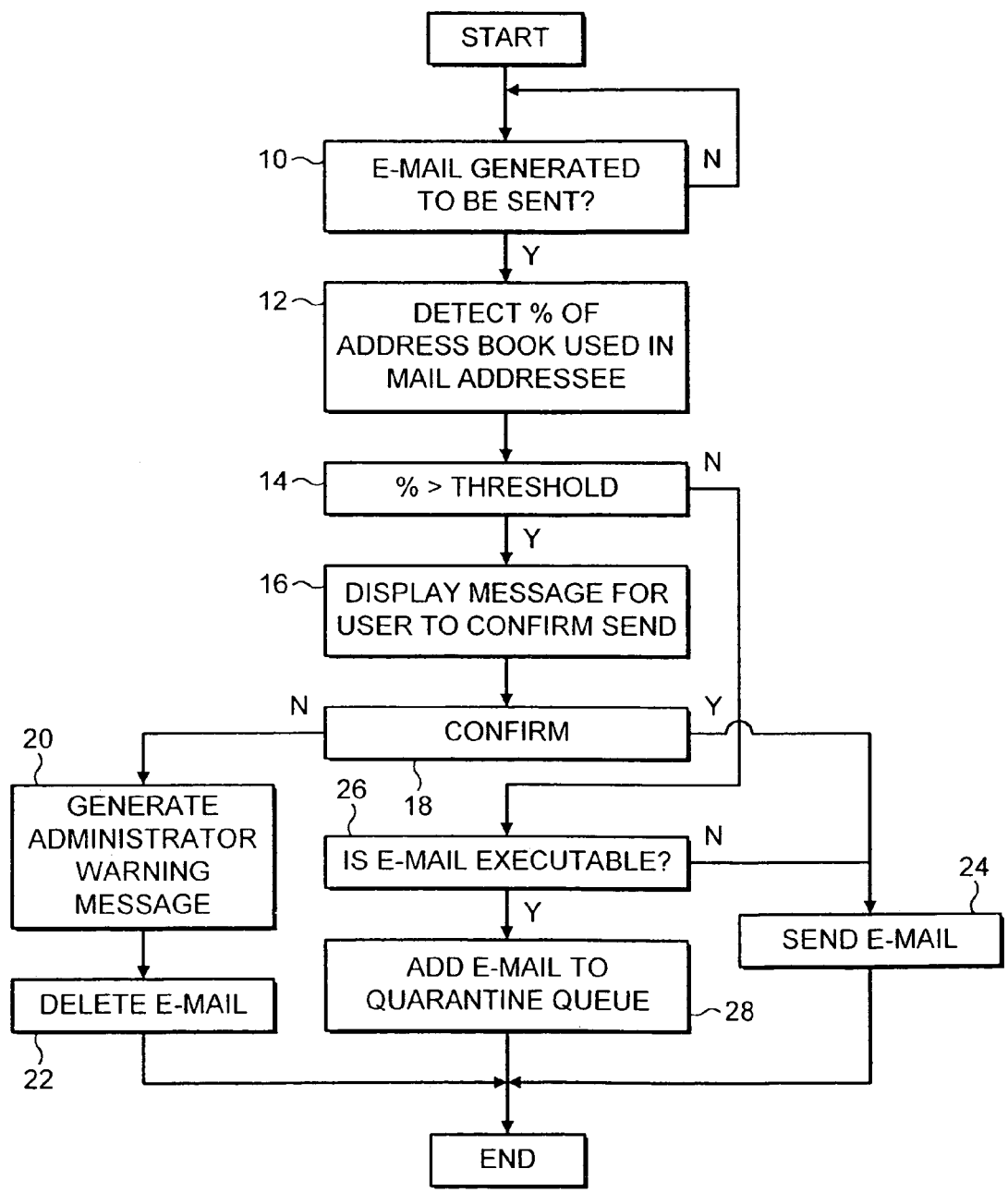
FIG. 3 is a flow diagram schematically illustrating processing performed upon generation of an e-mail message by a client computer.

FIG. 3 schematically illustrates processing performed upon generation of a new e-mail message within an e-mail client computer program. At step 10 the system waits for a new e-mail message to be generated. When a new e-mail message is generated, processing proceeds to step 12 at which the addressees of the e-mail message are identified and compared with the contents of the address book for the client computer user who is sending the e-mail message and a determination made as to the percentage of the total address book addresses who are being addressed by the new e-mail message. At step 14 this determined percentage is compared with a threshold level (which may be a user specified parameter or within a more managed environment an administrator specified value). If the threshold value is exceeded, then this is indicative of behaviour characteristic of a malware containing e-mail message. Accordingly, step 16 serves to generate an appropriate warning message to the user of the client e-mail computer program seeking confirmation from the user that the e-mail message should in fact be sent. In this way, if the message was not one genuinely produced by the user, such as one automatically generated by an item of malware inappropriately reading the user's address book to propagate itself, then the user will not confirm the message for sending at step 18 and processing will be directed to step 20. Step 20 serves to generate a warning message that is sent to a system administrator before processing proceeds to step 22 at which the e-mail message is deleted. If this were a stand-alone system, then step 20 could be deleted. In some systems step 20 could instead send a message to an anti-virus computer program provider to provide warning of new malware outbreaks, possibly including forwarding a copy of the e-mail message which had been identified as containing the malware.

If at step 18 the user confirmed the message was to be sent then processing proceeds to step 24 at which the e-mail is sent out from the client computer.

If the test at step 14 did not indicate that the threshold was exceeded, then processing proceeds to step 26. Step 26 determines whether or not e-mail message contains executable material, such as any executable attachments or an HTML body which could be executable. If the e-mail message does not have any executable content, then it may not serve as a vector for a virus and accordingly processing proceeds to step 24 at which the e-mail message is sent. However, if the test at step 26 indicates executable content, then processing proceeds to step 28 at which the e-mail message is added to a quarantine queue as will be described below.

After any one of steps 22, 24 and 28 processing of the e-mail message generated terminates for this processing flow and the system returns to step 10 to await generation of the next e-mail message.

Figure 4:
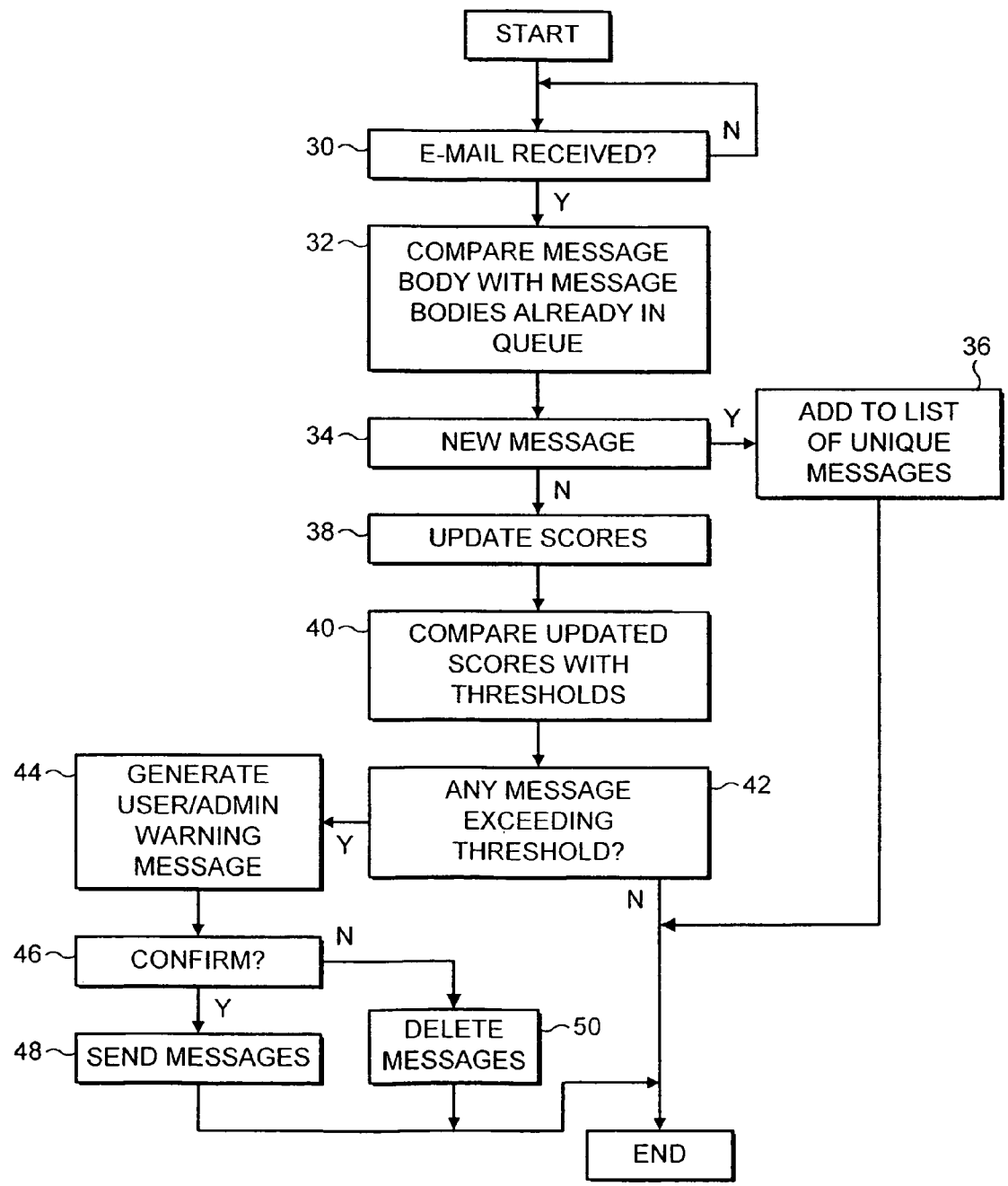
FIG. 4 is a flow diagram schematically illustrating receipt of an e-mail message into a quarantine queue within a client computer program.

FIG. 4 illustrates the action of the quarantine queue. At step 30 the system waits to receive an e-mail message as issued from step 28 of FIG. 3. When an e-mail message is received, step 32 serves to compare the received e-mail message with any existing messages currently held within the quarantine queue. The comparison could be one which identifies identical messages, or one which is more sophisticated and identifies as the same any messages sharing above a predetermined threshold level of content. An alternative would be to identify as the same any messages sharing a common attachment, as such attachments are typically the primary element of the malware. Step 34 determines if the received message is a new message. If the message is a new message, then step 36 adds it to the list of unique messages currently held within the quarantine queue and against which further received messages are to be compared. If the received message is not a new message, then processing proceeds to step 38 at which score values indicative of the messages held within the quarantine queue representing malware are updated. These score values may be one or more of a score indicating what proportion of the total content of the sender's address book have been sent a message sharing substantially the same content, either as a percentage of the address book or possibly in terms of an absolute number. Alternatively a simple count of the number of queued messages sharing substantially the same message content may be used.

At step 40 the updated score values are compared with threshold values, which again may be user or administrator specified. At step 42 any message which is now exceeding one of the threshold values is identified. If no message is identified, then processing of this received e-mail message terminates and the system returns to step 30 to await the next e-mail message. If an e-mail message does cause a threshold to be exceeded at step 42, then processing proceeds to step 44 at which a user and/or administrator warning message is generated giving details of the message exceeding the threshold value. At step 46 the user's confirmation that the message should be sent is sought. Depending upon the user's input, the message is either sent at step 48 or deleted at step 50 before processing again returns to step 30.

Figure 5:
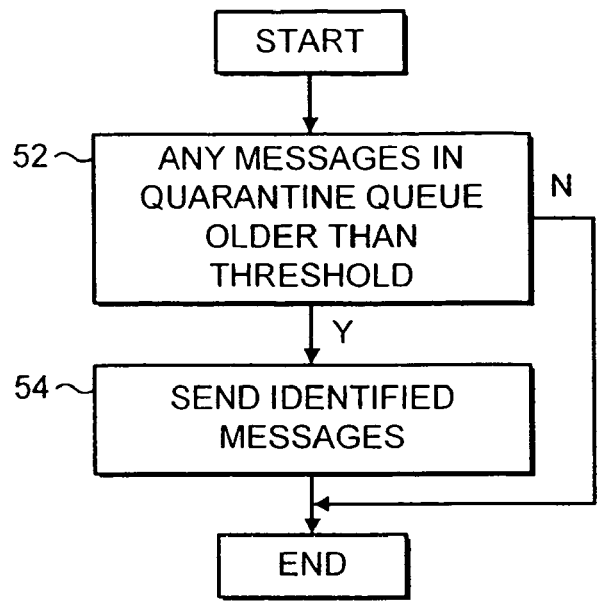
FIG. 5 is a flow diagram illustrating removal of an e-mail message from the quarantine queue after its quarantine period expires.

FIG. 5 is a flow diagram illustrating the removal of messages from the quarantine queue. The processing of FIG. 5 may take place as a separate thread/process compared to those previously discussed. At step 52 a determination is made as to whether or not any of the messages currently held within the quarantine queue have been held there for longer than a predetermined (user or administrator specified) quarantine period. If any such messages are identified, then processing proceeds to step 54 at which they are sent out from the quarantine queue to their destination. Alternatively, processing terminates for a delay period until the next check of the quarantine queue for messages to be released is scheduled.

Figure 6:
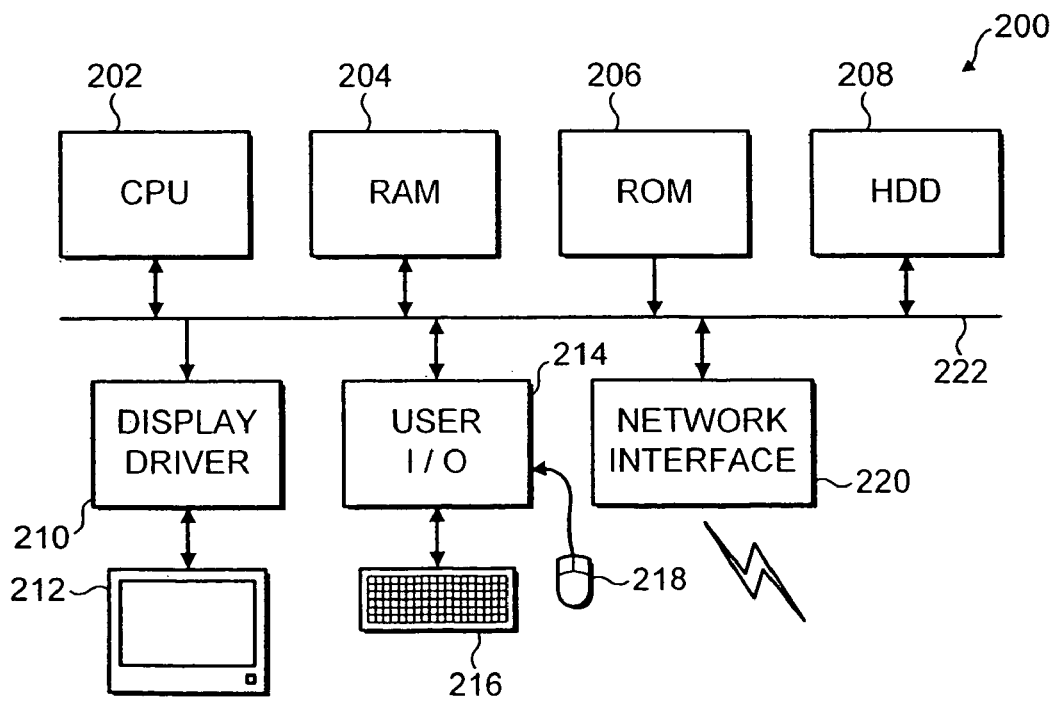
FIG. 6 is a schematic diagram of a general purpose computer of the type which may be used to perform the above described techniques.

FIG. 6 schematically illustrates a general purpose computer 200 of the type that may be used to implement the above techniques. The general purpose computer 200 includes a central processing unit 202, a random access memory 204, a read only memory 206, a hard disk drive 208, a display driver 210 and display 212, a user input/output circuit 214 and keyboard 216 and mouse 218 and a network interface unit 220 all connected via a common bus 222. In operation the central processing unit 202 executes program instructions stored within the random access memory 204, the read only memory 206 or the hard disk drive 208. The working memory is provided by the random access memory 204. The program instructions could take a variety of forms depending on the precise nature of the computer 200 and the programming language being used. The results of the processing are displayed to a user upon the display 212 driven by the display driver 210. User inputs for controlling the general purpose computer 200 are received from the keyboard 216 and the mouse 218 via the user input/output circuit 214. Communication with other computers, such as exchanging e-mails, downloading files or providing internet or other network access, is achieved via the network interface unit 220.

It will be appreciated that the general purpose computer 200 operating under control of a suitable computer program may perform the above described techniques and provide apparatus for performing the various tasks described. The general purpose computer 200 also executes the method described previously. The computer program product could take the form of a computer readable storage medium bearing the computer program, such as a floppy disk, a compact disk or other computer readable storage medium. Alternatively, the computer program could be dynamically downloaded via the network interface unit 220.

It will be appreciated that the general purpose computer 200 is only one example of the type of computer architecture that may be employed to carry out the above described techniques. Alternative architectures are envisaged and are capable of use with the above described techniques.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product comprising a computer readable storage medium bearing a computer program operable to control an e-mail client computer to detect e-mail propagated malware, said computer program product comprising:

e-mail generating logic operable to generate an e-mail message;

comparison logic operable to compare said e-mail message with at least one of an address book of a sender of said e-mail message and one or more previously generated e-mail messages from said client computer; and identifying logic operable to identify whether:
  (i) said e-mail message is being sent to more than a threshold number of addressees specified within said address book;
  (ii) said e-mail message contains message content having at least a threshold level of similarity to non-identical message content of said previously generated e-mail messages being sent to more than a threshold number of addressees specified within said address book; and
  (iii) said e-mail message contains message content having at least a threshold level of similarity to non-identical message content of more than a threshold number of said previously generated e-mail messages;

wherein said identifying logic is further operable to identify said email message as potentially containing malware if at least one of items (i), (ii), and (iii) is identified; and quarantine queue logic operable to hold said previously generated e-mail messages in a quarantine queue for at least a predetermined quarantine period prior to being sent from said client computer;

wherein said quarantine queue logic is further operable such that it is determined whether said email message is a new message by comparing said email message with said previously generated e-mail messages held in said quarantine queue;

wherein said quarantine queue logic is further operable such that said email message is added to said quarantine queue in response to a determination that said email message is said new message;

wherein said quarantine queue logic is further operable such that a score value indicative of one of said previously generated e-mail messages held in said quarantine queue is updated in response to a determination that said email message is not said new message, said score value indicating a proportion of said addressees specified within said address book that have previously been sent said message sharing at least said threshold level of similarity to non-identical message content of said one of said previously generated e-mail messages.

2. A computer program product as claimed in claim 1, wherein said e-mail message specifies a plurality of addressees, said comparison logic being operable to compare said plurality of addressees with said e-mail address book to determine if said at least a threshold number of addressees has been exceeded.

3. A computer program product as claimed in claim 1, wherein said at least a threshold number of addressees is specified as a proportion of addressees within said address book.

4. A computer program product as claimed in claim 3, wherein said proportion of addressees within said address book is user specified.

5. A computer program product as claimed in claim 1, wherein said quarantine period is user specified.

6. A computer program product as claimed in claim 1, comprising confirmation input logic operable when said e-mail message is identified as potentially containing malware to generate a user message seeking a confirmation input from a user of said client computer before said e-mail message is sent.

7. A computer program product as claimed in claim 1, comprising administrator warning logic operable when said e-mail message is identified as potentially containing malware to send an administrator warning message to an administrator of said client computer regarding said e-mail message.

8. A computer program product as claimed in claim 1, wherein said e-mail message is identified as potentially containing malware only if said e-mail message includes an executable element, to speed processing.

9. A computer program product as claimed in claim 1, wherein said e-mail message is identified as potentially containing malware when said e-mail message and said previously generated e-mail messages share a common attachment.

10. A computer program product as claimed in claim 1, wherein a message is sent to a malware computer program provider to provide a warning of new malware outbreaks when said e-mail message is identified as potentially containing malware.

11. A computer program product as claimed in claim 10, wherein said message to said malware computer program provider includes a copy of said e-mail message.

12. A method of detecting e-mail propagated malware within an e-mail client computer, said method comprising the steps of:
   generating an e-mail message;
   comparing said e-mail message with at least one of an address book of a sender of said e-mail message and one or more previously generated e-mail messages from said client computer;
   identifying whether:
      (i) said e-mail message is being sent to more than a threshold number of addressees specified within said address book;
      (ii) said e-mail message contains message content having at least a threshold level of similarity to non-identical message content of said previously generated e-mail messages being sent to more than a threshold number of addressees specified within said address book; and
      (iii) said e-mail message contains message content having at least a threshold level of similarity to non-identical message content of more than a threshold number of said previously generated e-mail messages;
   wherein said email message is identified as potentially containing malware if at least one of items (i), (ii), and (iii) is identified; and
   holding said previously generated e-mail messages in a quarantine queue for at least a predetermined quarantine period prior to being sent from said client computer;
   wherein it is determined whether said email message is a new message by comparing said email message with said previously generated e-mail messages held in said quarantine queue;
   wherein said email message is added to said quarantine queue in response to a determination that said email message is said new message;
   wherein a score value indicative of one of said previously generated e-mail messages held in said quarantine queue is updated in response to a determination that said email message is not said new message, said score value indicating a proportion of said addressees specified within said address book that have previously been sent said message sharing at least said threshold level of similarity to non-identical message content of said one of said previously generated e-mail messages.

13. A method as claimed in claim 12, wherein said e-mail message specifies a plurality of addressees, said plurality of addressees being compared with said e-mail address book to determine if said at least a threshold number of addressees has been exceeded.

14. A method as claimed in claim 12, wherein said at least a threshold number of addressees is specified as a proportion of addressees within said address book.

15. A method as claimed in claim 14, wherein said proportion of addressees within said address book is user specified.

16. A method as claimed in claim 12, wherein said quarantine period is user specified.

17. A method as claimed in claim 12, wherein when said e-mail message is identified as potentially containing malware, then a user message is generated seeking a confirmation input from a user of said client computer before said e-mail message is sent.

18. A method as claimed in claim 12, wherein when said e-mail message is identified as potentially containing malware, then an administrator warning message is sent to an administrator of said client computer regarding said e-mail message.

19. Apparatus for detecting e-mail propagated malware within a client computer, said apparatus comprising:
   an e-mail generator operable to generate an e-mail message;
   a comparator operable to compare said e-mail message with at least one of an address book of a sender of said e-mail message and one or more previously generated e-mail messages from said client computer;
   a malware identifier operable to identify whether:
      (i) said e-mail message is being sent to more than a threshold number of addressees specified within said address book;
      (ii) said e-mail message contains message content having at least a threshold level of similarity to non-identical message content of said previously generated e-mail messages being sent to more than a threshold number of addressees specified within said address book; and
      (iii) said e-mail message contains message content having at least a threshold level of similarity to non-identical message content of more than a threshold number of said previously generated e-mail messages;
   wherein said malware identifier is further operable to identify said email message as potentially containing malware if at least one of items (i), (ii), and (iii) is identified;
   and a quarantine queue operable to hold said previously generated e-mail messages in a quarantine queue for at least a predetermined quarantine period prior to being sent from said client computer;

wherein said quarantine queue is further operable such that it is determined whether said email message is a new message by comparing said email message with said previously generated e-mail messages held in said quarantine queue;

wherein said quarantine queue is further operable such that said email message is added to said quarantine queue in response to a determination that said email message is said new message;

wherein said quarantine queue is further operable such that a score value indicative of one of said previously generated e-mail messages held in said quarantine queue is updated in response to a determination that said email message is not said new message, said score value indicating a proportion of said addressees specified within said address book that have previously been sent said message sharing at least said threshold level of similarity to non-identical message content of said one of said previously generated e-mail messages.

20. Apparatus as claimed in claim 19, wherein said e-mail message specifies a plurality of addressees, said comparitor being operable to compare said plurality of addressees with said e-mail address book to determine if said at least a threshold number of addressees has been exceeded.

21. Apparatus as claimed in claim 19, wherein said at least a threshold number of addressees is specified as a proportion of addressees within said address book.

22. Apparatus as claimed in claim 21, wherein said proportion of addressees within said address book is user specified.

23. Apparatus as claimed in claim 19, wherein said quarantine period is user specified.

24. Apparatus as claimed in claim 19, comprising a confirmation input unit operable when said e-mail message is identified as potentially containing malware to generate a user message seeking a confirmation input from a user of said client computer before said e-mail message is sent.

25. Apparatus as claimed in claim 19, comprising an administrator warning unit operable when said e-mail message is identified as potentially containing malware to send an administrator warning message to an administrator of said client computer regarding said e-mail message.

* * * * *